United States Patent [19]

Wightman

[11] 4,453,332

[45] Jun. 12, 1984

[54] HAND GRIP FOR FISHING ROD HANDLE

[76] Inventor: Donald R. Wightman, Greentree Village North, 12015 O'Connor Rd., Lot No. 83, San Antonio, Tex. 78233

[21] Appl. No.: 361,599

[22] Filed: Mar. 25, 1982

[51] Int. Cl.³ .............................................. A01K 87/00
[52] U.S. Cl. ........................................... 43/23; 43/25; 16/DIG. 25
[58] Field of Search ...................... 43/21.2, 22, 23, 25; 16/DIG. 24, DIG. 25, 116 R; 38/95; 74/551.9, 558.5

[56] References Cited

U.S. PATENT DOCUMENTS

| | | | |
|---|---|---|---|
| 467,202 | 1/1892 | Rutz | 43/25 |
| 2,180,323 | 11/1939 | Maxwell | 43/23 |
| 2,639,521 | 5/1953 | Rickettson | 16/116 R |
| 4,014,129 | 3/1977 | Capra | 43/23 |

Primary Examiner—Nicholas P. Godici
Assistant Examiner—Marc Hodak
Attorney, Agent, or Firm—Cox & Smith Incorporated

[57] ABSTRACT

A removable hand grip for use on a fishing rod handle of the type having two axial shiftable rings for mounting a spinning or similar fishing reel having a T-shaped mounting bracket. The hand grip has a generally U-shaped cross-section and a tapering upper surface along the longitudinal axis thereof with a transverse convex exterior surface. In the preferred embodiment, the hand grip is removably secured to the fishing rod handle on the reel mounting portion of the handle opposite the reel mounting bracket. Alternatively, the hand grip may be formed integrally with the fishing rod handle.

8 Claims, 3 Drawing Figures

HAND GRIP FOR FISHING ROD HANDLE

BACKGROUND OF THE INVENTION

This invention relates generally to a hand grip for use on a flashing rod handle, and specifically to a hand grip for use on a fishing rod handle of the type having two axial shiftable rings or other means for mounting a reel of the type having a T-shaped mounting bracket, generally referred to as open-faced spinning reels. The hand grip may either be removable or formed integrally with the fishing rod handle.

Spinning rods typically have front and rear handle portions on either side of a reel seat or reel mounting portion of the fishing rod handle. Spinning reels generally have a T-shaped mounting bracket which mounts on the underside of the reel seat or reel mounting portion of the fishing rod handle such that the reel extends downwardly from the underside of the rod. The reel is secured to the handle through a pair of axially shiftable rings or other means which include portions which receive the ends of the T-shaped reel mounting bracket.

Gripping a fishing rod with a spinning reel attached requires the fisherman to hold the rod handle adjacent the reel seat or reel mounting portion of the fishing rod handle, usually with one or more fingers on either side of the T-shaped reel mounting bracket. The fishing handle thus rests in the curvature of the fisherman's fingers resting on the bottom side of the rod with the fisherman's palm on the side of the handle and the fisherman's thumb either along the top of the fishing rod handle or curved around to meet the fingertips. In the normal fishing position, the rod is held outwardly at a slight angle above the horizontal. Consequently, the fisherman's wrist is in an extended sideward downward twist, that is, an ulnar deviation. In other words, if the user's hand was the supine or palm up position, the hand movement would be adduction. Holding the rod in such position for extended periods of time leads to fatigue and soreness of the wrist joint and muscles.

Numerous hand grips for fishing rods, including spinning rods, have been devised in the past. Usually, such grips simply encircle the reel seat or reel mounting portion of the fishing rod handle providing a cushioned grip. None, however, prior to the present invention, provide for readjustment of the wrist angle, namely significantly decreasing or eliminating ulnar deviation or adduction, thereby alleviating fatigue and wrist strain.

For example, U.S. Pat. No. 3,410,017 to Wilson discloses a cylindrical fishing rod grip for covering the discontinuities in the reel seat area of the rod to provide a comfortable hand gripping surface. U.S. Pat. No. 2,826,852 to Wardrip discloses a finger grip attachment for spinning reel type fishing rods and U.S. Pat. No. 3,973,348 to Shell discloses a removable wrap-around-type fishing rod hand grip. U.S. Pat. No. 3,156,998 to McDaniel discloses a generally cylindrical hand piece for a fishing rod. U.S. Pat. No. 467,202 to Rutz discloses a detachable hand piece for use on a fishing rod.

SUMMARY OF THE INVENTION

As aforesaid, the present invention comprises a hand grip for use on spinning reel type fishing rod handles, namely the type having two axially shiftable rings or other means for mounting spinning reels which have a T-shaped mounting bracket. The hand grip may be either removable or formed integrally with the fishing rod handle.

The hand grip of the present invention serves to provide an inclined upper gripping surface on the fishing rod which readjusts the wrist angle relative to the fishing rod, and which allows the wrist to be maintained in its normal or neutral position rather than in the uncomfortable ulnar deviated, adducted, or downward twisted position.

In the preferred embodiment of the invention, the hand grip is formed of a body member having a generally U-shaped cross-section and a tapering upper surface from one end to the other along the longitudinal axis thereof to provide the inclined gripping surface. The hand grip preferably has a transverse convex exterior surface for providing a smooth comfortable gripping surface for the user's hand.

Thus, the present invention serves as a wrist realignment means by providing an upper inclined fishing rod handle gripping surface wherein the wrist of the fishing rod user is maintained generally at the neutral rest position during use; the wrist rest position being considered the normal neutral non-rotated wrist position and including a slight downwardly rotated position, that is a slight adducted or ulnar deviated position.

It is therefore a principal object of the present invention to provide a fishing rod hand grip which provides the fishing rod user with a facile means for obtaining a restful wrist position while holding the fishing rod.

It is furthermore an object of the present invention to provide a fishing rod hand grip having an upper inclined gripping surface wherein the wrist angle of the fishing rod user is maintained generally at a neutral or rest position.

It is a further object of the present invention to provide a fishing rod hand grip having a generally U-shaped cross-section and a tapering upper surface along the longitudinal axis of the hand grip and having a transverse convex exterior surface providing a convenient and comfortable upper gripping surface for the fishing rod user.

Another object of the present invention is to provide an easily usable and constructed removable fishing rod hand grip which decreases the fatigue experienced over extended periods of use.

These and other objects, features and advantages of the invention will become evident in light of the following detailed description, viewed in conjunction with the referenced drawings, of a preferred hand grip for fishing rod handles according to the invention. The foregoing and following description of the invention is for exemplary purposes only. The true spirit and scope of the invention is set forth in the appended claims.

DETAILED DESCRIPTION OF THE DRAWINGS

Figure 1:
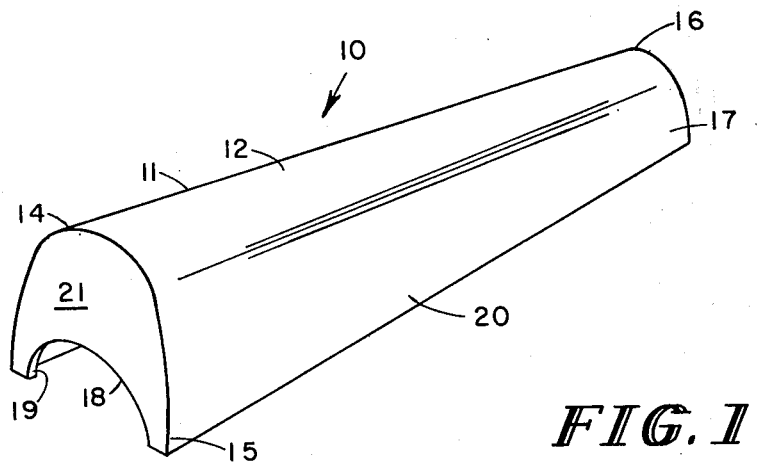
FIG. 1 is a perspective view of a fishing rod handle according to the present invention.
Figure 2:
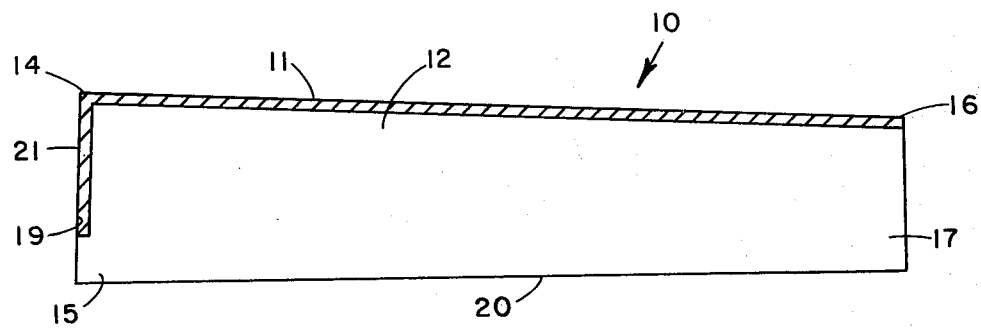
FIG. 2 is a cross-sectional view of a fishing rod hand grip according to the present invention.
Figure 3:
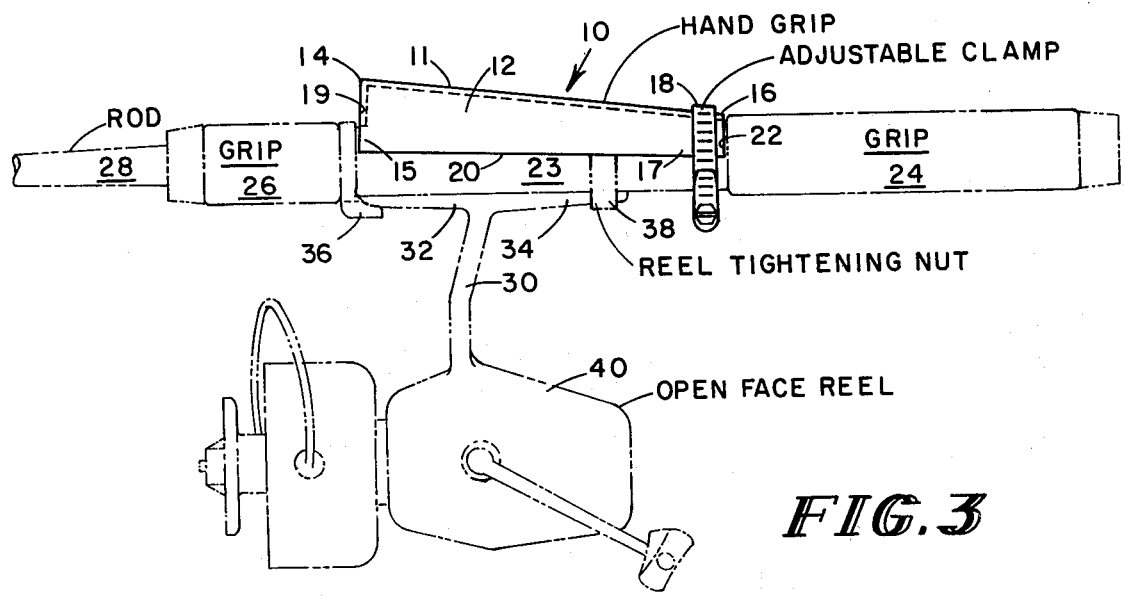
FIG. 3 is a side elevational view of a fishing rod hand grip according to the present invention mounted on a fishing rod handle, shown in phantom line.

FIGS. 1-3 illustrate the present invention in its preferred embodiment, namely a removable hand grip for fishing rod handles of the type having two axially shiftable rings or other means for mounting spinning reels of the type having a T-shaped mounting bracket. It will be readily appreciated, however, that the invention herein is to provide an inclined upper gripping surface for fishing rod handles serving to realign the wrist angle of the user. Accordingly, the invention may be embodied in removable hand grips, or hand grips formed integrally with fishing rod handles. The invention may also find service with other fishing rod handle types.

Referring to FIG. 1, a removable hand grip according to the present invention 10 consists of a body member 11 having a generally U-shaped cross-section and an upper surface tapering from one end 14 along the longitudinal axis of the body member 11 to a second end 16, thereby forming an upper inclined gripping surface. Body member 11 has a transverse convex exterior surface 12 terminating in flanges 20 which overlay the upper portion of the reel mounting portion or reel seat area 23 of the fishing rod handle, as most clearly shown in FIG. 3.

An upright member 21 is affixed to or formed integrally with body member 11 at the upper end 14 thereof. Upright member 21 has a lower generally concave ridge 18 terminating at ends 19. Again referring to FIG. 3, concave ridge 18 generally matches the radius of curvature of the upper surface of the reel mounting portion or reel seat area 23 of a fishing rod handle. Thus, upright member 21 maintains body member 11 at an inclined position. The height of upright member 21 is chosen such that the wrist of the user is maintained at a neutral or rest position or with a slight downward angle (a slight ulnar deviation or adduction) during normal use of the fishing rod.

Referring to FIG. 3, a typical spinning reel type fishing rod handle and attached reel is shown in phantom line. The typical spinning-reel type fishing rod handle includes a rear grip 24 and a forward grip 26 with fishing rod 28 inserted therethrough. Between grips 24 and 26 is the reel mounting portion or reel seat area 23 of the typical fishing rod grip. The mounting means typically includes two axially shiftable rings 36 and 38. Generally, ring 36 is fixed to the reel seat area and ring 38 is either slid or rotated into position to engage the T-shaped mounting bracket 32, 34 and 30 of an open-face type spinning reel 40. Numerous alternatives, of course, are present on the market and the foregoing description is exemplary only.

The hand grip of the present invention 10, as shown in FIG. 3, is mounted over the reel mounting portion or reel seat area of the fishing rod handle such that concave ridge 18 rests about the upper surface of the reel seat area with flange 15 continuing to extend over the upper surface of the reel seat area. Flange 20 runs along the side of the upper reel seat area of the fishing rod grip and terminates in flange 17. Thus, the hand grip of the present invention 10 provides a body member 11 inclining from upper edge 14 to lower edge 16. The hand grip 10 may be secured to the fishing rod handle through an adjustable clamp 18 encircling the fishing rod grip and body member 11 at the lower end 16 thereof.

A small area 22 should be left opposite clamp 18 and, although not shown, a small ridge may be formed thereon to prevent clamp 18 from slipping off. As can now be readily appreciated, the hand grip 10 according to the present invention realigns the wrist angle of the fishing rod user to maintain a wrist angle generally at the neutral rest position, although the wrist may also have a slight ulnar deviation or downward rotation.

Hand grip 10, according to the present invention further provides a fishing rod hand grip which furnishes the fishing rod user with a facile means for obtaining a restful wrist position while holding a fishing rod, and furthermore, provides a fishing rod hand grip having an upper inclined gripping surface wherein the wrist angle of the user is maintained at a neutral rest position decreasing fatigue over extended periods of use.

Further, hand grip 10 provides a convenient and comfortable upper gripping surface for the fishing rod user, and is easily usable and constructed.

Although the invention has been described in conjunction with the foregoing specific embodiment, many alternatives, variations and modifications will be apparent to those of ordinary skill in the art. Those alternatives, variations, and modifications are intended to fall within the spirit and scope of the appended claims.

I claim:

1. A removable hand grip in combination with a fishing rod handle of the type having means for mounting a reel having a T-shaped mounting bracket, said hand grip consisting essentially of:
   a body member having a generally U-shaped cross-section and a single downwardly inclined upper surface along the longitudinal axis of said body member from the front of the handle towards the back and said upper surface being transversely convex; and means for securing said body member to said fishing rod handle opposite said reel such that said hand grip provides an inclined upper gripping surface on said fishing rod handle.

2. A removable hand grip for use on a fishing rod handle as in claim 1 wherein said hand grip further comprises:
   an upright member at one end of said body member having a lower generally concave ridge generally matching the radius of curvature of the reel mounting portion of said fishing rod handle.

3. A removable hand grip for use on a fishing rod as in claim 1 wherein said grip further comprises longitudinally extending flanges along the edges of said convex exterior surface for overlaying the reel mounting portion of said fishing rod handle.

4. A removable hand grip for use on a fishing rod handle as in claim 1 wherein said means for securing said body member to said fishing rod comprises clamping means encircling the smaller of the two ends of said tapered body member and the reel mounting portion of said fishing rod handle.

5. A hand grip in combination with a fishing rod handle consisting essentially of:
   a body member adapted for mounting on a fishing rod handle and having an upper single inclined surface inclining downwardly from the front of the fishing rod handle to the back thereof, whereby the wrist of a user is maintained generally at a neutral rest position during the normal use of the fishing rod.

6. A hand grip for a fishing rod handle as in claim 5 further comprising:
   means for removably securing said body member to said fishing rod handle.

7. A hand grip for a fishing rod handle as in claim 5 wherein said body member has a generally U-shaped cross-section.

8. A hand grip for a fishing rod handle as in claim 5 wherein said body member has a generally transverse convex exterior surface.

* * * * *